Patented Nov. 18, 1947

2,430,860

UNITED STATES PATENT OFFICE 2,430,860

POLYAMIDE-FORMALDEHYDE REACTIONS AND PRODUCTS THEREOF

Theodore Le Sueur Cairns, Wilmington, Del., assignor to E. I. du Pont de Nemours & Company, Wilmington, Del., a corporation of Delaware No Drawing. Application June 7, 1944, Serial No. 539,195

15 Claims. (Cl. 260—72)

This invention relates to polymeric materials and more particularly to synthetic polyamides of nylon type.

This application is a continuation-in-part of my application Serial No. 445,635, filed June 3, 1942.

The polyamides with which this invention is primarily concerned are of the general type described in United States Patents 2,071,250, 2,071,253 and 2,130,948. The polyamides of this kind, generally speaking, comprise the reaction product of linear polymer-forming composition containing amide-forming groups, for example, reacting material consisting essentially of bifunctional molecules each containing two reactive groups which are complementary to reactive groups in other molecules and which include complementary amide-forming groups. These polyamides can be obtained by the methods given in the above mentioned patents and by other methods, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polyamides obtained from these reactants have an intrinsic viscosity of at least 0.4 and a unit length of at least 7, where "unit length" is defined as in United States Patents 2,071,253 and 2,130,948. The average number of carbon atoms separating the amide groups in these polyamides is at least two.

These linear polyamides include also polymers, as for instance the polyester-amides, obtained by admixture of other linear polymer-forming reactants, as for instance glycol-dibasic acid mixtures or hydroxy acids, with the mentioned polyamide-forming reactants. Both the simple and modified linear polyamides contain the recurring amide groups

in which X is oxygen or sulfur and R is hydrogen or a monovalent hydrocarbon radical, as an integral part of the main chain of atoms in the polymer. On hydrolysis with hydrochloric acid the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid.

The polyamides described above are useful in many ways, particularly in the form of fibers. However, most of the prior polyamides are insoluble in common organic solvents and cannot therefore be used conveniently for the preparation of solvent-cast films and coatings. Certain alcohol-soluble polyamides have been prepared previously but these are all derived from complicated multi-ingredient systems, or by using special and expensive diamines, such as triglycoldiamine.

The invention has as an object a new method for preparing polyamides having improved properties. A further object is a method for obtaining polyamides by chemical modification of readily available polyamides, such as polyhexamethylene adipamide and polyhexamethylene sebacamide. A still further object is the production of new and useful polymeric materials. Still another object is the preparation of polymers which are fusible and soluble in methanol and which can be formed into films, fibers, coatings, etc., and then converted to a methanol insoluble, infusible form. Other objects will appear hereinafter.

The above objects are accomplished through the production of a new class of nitrogen-substituted polyamides by a process comprising reacting a linear polyamide, which has an intrinsic viscosity of at least 0.4 and contains hydrogen-bearing amide groups as an integral part of the main polymer chain, with formaldehyde and a formaldehyde-reactive organic compound having hydrogen attached to an element of groups V and VI of Series 2 and 3 of the periodic table, particularly an alcohol or mercaptan, in the presence of a catalyst consisting essentially of oxygen-containing acid having an ionization constant at least as great as $9.6 \times 10^{-6}$ and an equivalent conductance, measured at 25° C. in 0.01 N concentration, no greater than 370 ohms$^{-1}$. cm$^2$.

The initial polyamides should be of sufficiently high molecular weight to have an intrinsic viscosity of at least 0.4 (defined as in U. S. 2,130,948) to insure the formation of tough products. This means that the initial polyamides are those prepared from polymer-forming reactants containing complementary polymer-forming groups in substantially equimolecular amounts. Thus, if a polyamide of the diamine-dibasic carboxylic acid type is used the diamine and dibasic acid used will be in substantially equimolecular proportion. Use of one of the reactants, e. g. the dibasic acid or an amide-forming derivative thereof such as the diester or diamide, in appreciable excess (above about 5%) leads to the formation of a polyamide of too low molecular weight to come within the scope of the initial polyamides used in the present process.

The acid used as catalyst should have an ionization constant of at least $9.6 \times 10^{-6}$ (for the first hydrogen in the case of polybasic acids), but should not have an equivalent conductance, measured at 25° C. and 0.01 normal concentration, greater than 370 ohms$^{-1}$. cm$^2$. Roughly speaking, this means that the acids will be at least as strong as trimethylacetic acid and not stronger than p-toluenesulfonic acid. Equivalent conductance rather than ionization constant is used to characterize the stronger acids included in this range since it can be determined more reliably in the case of strong acids. Examples of acids falling in this range that have been used as catalysts in the process of this invention are formic, trimethylacetic, trichloroacetic, oxalic, chloroacetic, benzoic, maleic, p-toluenesulfonic acids, phosphoric acid, and acids of phosphorus such as $(CH_3)H_2PO_4$ and $(C_4H_9)H_2PO_4$. In the case of hydroxycarboxylic acids, mercaptocarboxylic acids, and other acids containing groups reactive with formaldehyde, these acids can serve as both the acid catalyst and as the above defined formaldehyde-reactive organic compound.

No substantial amount of acid having an equivalent conductance greater than 370, when measured at 25° C. in 0.01 N concentration, should be present in the reaction mixture. If hydrochloric acid (equivalent conductance at 25° C. in 0.01 N concentration=412) is present, for example, degradation of the polymer takes place with the result that an inferior product is obtained. Nitric acid (equivalent conductance at 25° C. in 0.01 N concentration=407.3) is also unsuitable because of its oxidation and degrading effect. Sulfuric acid (equivalent conductance at 25° C. in 0.01 N concentration=336) can be used but is much less preferred than phosphoric and the carboxylic acids mentioned above.

The term "oxygen-containing acid" as used in the description and appended claims is intended to cover mixtures of oxygen-containing acids as well as a single oxygen-containing acid.

The formaldehyde-reactive compounds used in the practice of this invention are those organic compounds which contain groups known to be reactive with formaldehyde and which are further characterized by having hydrogen attached to one of the elements consisting of nitrogen, phosphorus, oxygen and sulfur. These compounds contain reactive hydrogen as determined by the Zerewitinoff method. The preferred compounds of this kind are alcohols and mercaptans. However, amides, sulfonamides, amines, and phosphines may also be used.

One procedure for carrying out the invention is a solution method in which the polyamide is dissolved in formic acid and the solution is reacted at moderate temperature with an alcohol and formaldehyde. The formic acid is preferably of 70–100% concentration but any concentration which is a solvent for the polyamide can be used. The preferred procedure involving this method consists in preparing a solution of the polyamide obtained from hexamethylenediamine and adipic acid in formic acid at 60° C. and adding a solution of paraformaldehyde in methanol. The resulting solution is allowed to stand at 60° C. for about 30 minutes and the reaction product is then isolated. Various methods of isolation can be used. For example, if the reaction mixture is added to a solution of acetone and water (1:1 by volume) a clear solution results from which the N-methoxy-methyl polyhexamethylene adipamide separates after the addition of excess aqueous ammonia. Another method of isolation consists in the addition of the reaction mixture to aqueous sodium hydroxide or in the addition of a non-solvent such as water or methyl formate to the reaction mixture.

The solution method can be operated over a wide temperature range. The temperature can be at least as low as 0° C. and the upper temperature is limited only by the stability of the polymer. Degradation of the polyamide chain will take place on prolonged heating at temperatures as low as 100° C., but by suitable shortening the time of reaction, temperatures as high as 150° C. can be used. The preferred temperature is from 25° to 75° C.

When the reaction is carried out in the above manner not necessarily all the hydrogen-bearing amide groups of the original polyamide are converted to N-methoxymethyl amide groups. The degree of substitution can be controlled readily and also can be varied over wide ranges. The degree of substitution varies with practically every condition of reaction, such as time, temperature, etc. but is most greatly affected by the amount of formaldehyde used and the amount of water present in the reaction mixture. Increasing the amount of formaldehyde results in an increase in the degree of substitution, while decreasing the amount of water present increases the degree of substitution. For example, if a given procedure carried out using 90% formic acid results in an N-methoxymethyl polyhexamethylene adipamide having 15–20% of the amide groups substituted, a completely analogous procedure using anhydrous formic acid results in 30–35% substitution. The fact that the degree of substitution can be varied and controlled is an important advantage of this invention. The properties of the N-alkoxymethyl polyamides vary greatly as the degree of substitution is changed. N-methoxymethyl polyhexamethylene adipamide of a low degree of substitution (15–30%) is very similar to the interpolymer obtained by reacting hexamethylenediamine-adipic acid salt, hexamethylene-diamine-sebacic acid salt, and caprolactam in proportions of 40%, 30% and 30% respectively, while those with higher degrees of substitution (40–60%) are low melting elastic products which can be worked on conventional milling and calendering equipment. It is generally desirable to produce sufficient substitution to lower the softening point of the original polyamide at least 20° C. From the standpoint of solubility characteristics products in which the degree of substitution is greater than 10% are preferred. However, products in which as little as 1% of the amide groups have been substituted differ appreciably from the original polyamide in that they can be insolubilized by heat.

Another method for preparing the present polyamides consists of treating a solid polyamide with an alcohol, or other formaldehyde-reactive compound of the kind previously mentioned, and formaldehyde in the presence of a small amount of phosphoric, oxalic, hydroxyacetic, formic, or other suitable oxygen-containing acid catalyst at a temperature between 20 and 250° C. In this method, which is referred to as the direct process since it starts with undissolved polyamide, the concentration of acid catalysts used will vary with the nature of the acid, but with many acids 1 to 2% (based on polyamide) is sufficient while with others as much as 10% may be necessary to bring about the reaction. The conditions of the reaction are also dependent upon the nature of the polyamide being treated. Thus, polyhexamethylene adipamide generally requires a somewhat higher temperature or longer time than does polyhexamethylene sebacamide; and multi-ingredient polyamides, such as interpolymer mentioned in the preceding paragraph, undergo reaction at room temperature. In general, however, it is desirable to operate between temperatures of 100° and 150° C., shortening the reaction time as the temperature is increased. The preferred catalyst in the direct process is phosphoric acid.

In this direct process there is a tendency to degrade the polyamide chain, particularly when operating at elevated temperatures. This degradation is very largely eliminated by a technique of withholding the acid catalyst until all the other reactants have reached the desired temperature and then injecting it into the reaction mixture. Another method to reduce degradation in the direct process is to buffer the acid catalyst used with substances such as pyridine, disodium phosphate or sodium acetate.

For certain uses it is unnecessary to isolate the product of the reaction in solid form. If it is desired to use the polymer in solution, the unconsumed formaldehyde may be removed by distillation methods. Particularly suitable is the procedure of counter-current distillation in which the reaction mixture is allowed to flow down a column through which a solvent, such as methanol or ethanol, is being distilled. In this way the formaldehyde is concentrated in the volatile material and a solution of the polymer essentially free of aldehyde is obtained from the bottom of the column.

The procedures described herein convert the functional group

of the polyamide to the functional group

in which A is an element chosen from groups V and VI of Series 2 and 3 of the periodic table and R is an organic radical. In the preferred embodiment of the invention wherein the previously defined formaldehyde-reactive compound is an alcohol or mercaptan, the new polyamide contains the above group in which A is oxygen or sulfur, i. e. a chalcogen having an atomic weight less than 33. The products in the case of the simple alcohols are N-alkoxymethyl polyamides and in the case of the simple mercaptans are N-alkylthiomethyl polyamides. The reaction involved is, possibly, first the formation of an N-methylol polyamide and then the etherification of this group with the alcohol or mercaptan present.

The products if heated very rapidly usually soften and melt at temperatures considerably below that of the original polyamide. However, if these polymers are subjected to a baking treatment at temperatures above 100° C., they become insoluble in common solvents and also infusible, even at temperatures as high as 285° C. This conversion to an insoluble, infusible form evidently involves linking of the various linear chains together since the heated products are no longer soluble, even in solvents such as phenol, which would dissolve the parent polyamide and further the alkoxy content of the heated products is only slightly lower than that of the soluble unheated material. This capacity for insolubilization is of great practical significance since it affords a means of preparing objects, such as films, fibers, etc., by conventional methods and then converting them to the insoluble, infusible state which are, of course, much more resistant to damage by solvents. This insolubilization is also accompanied by a major increase in the resistance of a film, molded object or coating to cracking on repeated flexing or when a highly strained portion comes in contact with water.

The invention is further illustrated by the following examples in which the parts are by weight.

*Example I*

A solution of 1 part of fiber-forming polyhexamethylene adipamide (intrinsic viscosity=1.0) in 3.7 parts of formic acid (commercial grade, specific gravity=1.20) was prepared at 60° C. in a stainless steel reaction vessel equipped with a mechanical stirrer and an opening for the addition of reagents. To this was added at 60° C. a solution of 1 part paraformaldehyde dissolved in 1.33 parts methanol containing 0.0006 parts sodium hydroxide to depolymerize the paraformaldehyde and render it soluble in the methanol. The resulting solution was maintained at 60° C. for 30 minutes during which time an additional 0.3 part of methanol was added. This solution was poured into a mixture of 9 parts acetone and 11.5 parts of cold water with stirring. The resulting solution was then made basic to litmus by the addition of concentrated aqueous ammonia, the mixture being maintained below 40° C. and stirred vigorously during this step. The reaction product, N-methoxymethyl polyhexamethylene adipamide, separated from the mixture as a white granular solid. This product was removed by filtration, washed thoroughly and dried in vacuum at 50° C.

The product contained 5.77% by weight of methoxyl groups which corresponds to 22% of the amide groups converted to N-methoxymethyl amide groups. It had an intrinsic viscosity, measured in cresol, of 1.13 and was soluble to at least 25% in hot 80% ethanol (i. e. 80 parts ethanol and 20 parts water). This sample melted at about 185° C. A film prepared by dry casting a solution of this polymer in 80% ethanol was transparent, had a tensile strength of 6400 lbs./sq. in., and an elongation at break of 532%. If necessary small quantities of soap (1–5%) can be added to the casting dope to eliminate any undesirable tackiness in the film when freshly cast.

*Example II*

In a stainless steel reaction vessel equipped with an external heating unit and a device for rocking the entire apparatus was placed 100 parts of fiber-forming polyhexamethylene adipamide (intrinsic viscosity=1.0), 75 parts paraformaldehyde, 160 parts methanol and 2 parts phosphoric acid. The vessel was sealed and heated up to 125° C. during about one hour; maintained between 115°–125° C. for 30 minutes and then cooled to room temperature during 45 minutes. The mixture was a translucent gel. It was dissolved in hot 95% ethanol containing sufficient ammonia to neutralize the phosphoric acid which was present. The alcohol solution was poured into water and the modified polyamide separated as a soft plastic mass. This product was found to contain 6.87% methoxyl groups, which means that about 27% of the amide groups in the original polyamide were converted into N-methoxymethyl amide groups.

*Example III*

One part of a fiber-forming interpolymer derived from hexamethylenediammonium adipate (30 parts) and hexamethylenediammonium sebacate (70 parts), (intrinsic viscosity about 0.8) was dissolved in 4 parts of formic acid (specific gravity=1.20) at 70°–80° C. To this solution was added a mixture of 0.66 part paraformaldehyde and 1.75 parts benzyl alcohol and the resulting mixture stirred for 20 minutes. The solution was diluted with 2.7 parts of 95% ethanol and then poured into aqueous sodium hydroxide. The product, an N-benzyloxymethyl polyamide, separated as a white fibrous solid which was readily soluble in hot alcohols.

*Example IV*

A solution of 30 parts of a fiber-forming interpolymer derived from hexamethylenediammonium adipate (30 parts) and hexamethylenediammonium sebacate (70 parts), (intrinsic viscosity about 0.8) in 120 parts of formic acid (specific gravity=1.20) was prepared at 70°–80° C. To this solution was added a mixture of 20 parts paraformaldehyde and 112 parts methyl hydroxyacetate and the mixture heated at about 75° C. for 30 minutes. This solution was poured into aqueous sodium hydroxide and the N-carbomethoxymethyl polyamide separated as a white fibrous solid. This product was readily soluble in aqueous alcohol and films prepared by drycasting such a solution had a tensile strength of 4000 lbs./sq. in. and an elongation at break of 455%. A solution of this polyamide in methanol at 65° C. was saponified by the action of alcoholic potassium hydroxide to yield the corresponding water-soluble potassium salt.

*Example V*

A solution of 1 part of fiber-forming polyhexamethylene adipamide (intrinsic viscosity=1.0) in 3.6 parts of formic acid (specific gravity=1.20) was prepared at 60° C. To this was added 3.4 parts of an aqueous solution containing 37% formaldehyde and 15% methanol and the mixture heated at 60° C. for 30 minutes. Into this solution was poured 25 parts of methyl formate. This caused the product to separate as a fine white powder.

The product contained 3.1% methoxyl and 2.2% methylol groups which indicated that 11% of the amide groups in the polyamide had been converted into N-methoxymethyl amide groups and 8% into N-methylol amide groups.

*Example VI*

A solution of 60 parts of fiber-forming polyhexamethylene adipamide (intrinsic viscosity=1.0) in 180 parts formic acid (specific gravity=1.20) was prepared at 60° C. and then cooled to room temperature. To this was added a solution of 60 parts paraformaldehyde in 120 parts of ethyl mercaptan containing a trace of sodium hydroxide and the mixture allowed to stand at room temperature for 62 minutes. To this solution was added 950 parts of acetone and the polymer precipitated by the addition of aqueous ammonia. This N-ethylthiomethyl polyhexamethylene adipamide contained 7.39% sulfur, indicating that about 31.4% of the amide groups had been converted into $CONCH_2SC_2H_5$ groups. This product was found to be readily soluble in hot alcohols and tough films or fibers could be prepared from such solutions.

*Example VII*

A solution of 2 parts of fiber-forming polyhexamethylene adipamide in 9.6 parts of formic acid (specific gravity=1.20) was prepared at 60° C. To this was added 3 parts of aniline and then 1 part of paraformaldehyde. After 30 minutes the solution was poured into aqueous sodium hydroxide and the polymer separated as a reddish solid.

*Example VIII*

A solution of 2 parts of fiber-forming polyhexamethylene adipamide in 9.6 parts of formic acid (specific gravity=1.20) was prepared at 60° C. To this was added 3 parts of acetamide and then 1 part paraformaldehyde. After 20 minutes the solution was poured into aqueous sodium hydroxide and the modified polymer separated as a spongy white solid. Unlike polyhexamethylene adipamide, this product was readily soluble in hot 95% ethanol and in acetic acid at room temperature.

*Example IX*

A solution of 1 part of fiber-forming polyhexamethylene adipamide in 3 parts of formic acid (specific gravity=1.20) was prepared at 60° C. To this was added 3.5 parts of hydroxyacetic acid, 1 part of paraformaldehyde and 1 part of water, and the mixture heated at 60° C. for 35 minutes. This solution was added to an acetone-water mixture and, after the addition of aqueous ammonia, the modified polyamide separated as a white solid. This product was readily soluble in hot aqueous alcohol. It contained 4.8% of combined formaldehyde which means that about 15% of the amide groups had been substituted.

*Example X*

In an agitated pressure autoclave was placed 500 parts of fiber-forming polyhexamethylene sebacamide (intrinsic viscosity about 0.9), 500 parts paraformaldehyde, and 725 parts methanol. This mixture was heated (with the autoclave closed) with stirring to 138° C. and a catalyst consisting 17.1 parts of 85% phosphoric acid in 50 parts methanol was then injected into the reaction mixture. Eight minutes after the injection of the catalyst (the average temperature during this time being 139.8° C.) the entire content of the autoclave was discharged rapidly into a mixture of 200 parts water and 640 parts methanol containing sufficient ammonia to neutralize the catalyst. The resulting solution was filtered under pressure using a diatomaceous earth filter aid and the clear filtrate poured into water. The N-methoxymethyl polyhexamethylene sebacamide separated as a soft plastic mass which was freed of impurities by washing in a stream of water while working the mass on rubber rolls. The white polymer was finally dried at 50° C. This product was found to contain 9.65% by weight of methoxyl groups which means that approximately 51% of the amide groups had been converted to methoxymethyl amide groups. This polymer was found to be readily soluble in warm alcohols and a film cast from such a solution had a strength of about 2000 lbs./in.$^2$, an elongation of 400% and an elastic recovery from 100% elongation of 90%. When soaked in water a film of this material increased in weight about 6.5%.

*Example XI*

In an enamel-lined autoclave was placed 65 parts of fiber-forming polyhexamethylene adipamide (intrinsic viscosity=1.0), 65 parts paraformaldehyde, 165 parts isobutyl alcohol and 25 parts water. The entire mixture was heated with agitation to 147° C. and 2.56 parts of 85% phosphoric acid injected into the mixture. The temperature was maintained at about 147° C. for 21 minutes and the solution then discharged into isobutyl alcohol containing sufficient ammonia to neutralize the phosphoric acid. The solution was clarified by filtration and the polymer precipitated by pouring the filtrate into water. The soft plastic mass which separated was washed free of formaldehyde and alcohol on wash rolls and finally dried at 50° C. This sample of N-isobutoxymethyl polyhexamethylene adipamide was found to contain 9.8% combined formaldehyde which corresponds to 52% of the amide groups substituted by N-isobutoxymethyl groups.

*Example XII*

A solution was prepared from 100 parts of fiber-forming polyhexamethylene adipamide (intrinsic viscosity=1.0) and 300 parts formic acid (Sp. gravity=1.20) at 60° C. To this was added a solution of 100 parts paraformaldehyde dissolved in 194 parts allyl alcohol. Twenty minutes after this addition another 194 parts allyl alcohol was added and the reaction allowed to continue for a further 10 minutes at 60° C. This solution was then poured into a mixture of 1000 parts ice-water and 790 parts acetone, and the modified polymer was caused to separate from this solution by the addition of aqueous ammonia sufficient to neutralize the acid present. The soft plastic polymer was washed on rolls for 30 minutes and then dried in vacuum. This product, N-allyloxymethyl polyhexamethylene adipamide, was found to be readily soluble in hot alcohols.

*Example XIII*

In a dough-type mixer equipped with a heating jacket and a reflux condenser was placed 55 parts of N-methoxymethyl polyhexamethylene adipamide (45% amide substitution) and 45 parts of methanol. This was heated with mixing at about 65° C. for a few hours whereby a clear, smooth solution of about 200 poise viscosity was obtained. To this solution was added 0.275 parts maleic acid and the solution mixed about 30 minutes. The resulting spinning dope was filtered and then forced to a spinneret by means of a gear pump, all these steps being carried out while maintaining the temperature of the solution at 60–65° C. The filaments formed as the dope extruded through the spinneret were led through a column about 8 feet in length heated to 180–190° C., talc was applied to the filaments to prevent sticking and the resulting yarn was wound up at a rate of about 120 yards per minute. This yarn was then rewound imparting about 80% stretch during the operation and then was baked at 80° C. for 8 hrs. The residual maleic acid was removed from the yarn by leaching in water for 24 hrs. and the yarn then dried, given 6 turns per inch and finally coned. The yarn prepared in this manner had the following properties:

Denier/filaments/twist=280/20/6
Tenacity-dry/wet=0.30/0.19 grams/denier
Elongation-dry/wet (per cent)=330/300
Elastic recovery from 100% stretch: Instant 93%; after 45 secs. 98%

Although the examples above describe a batch process, it is important to note that this process can be carried out in a continuous fashion by passing the reaction mixture through heated tubes or other suitable equipment.

The relative concentrations of reagents used in the process of this invention can be varied over wide limits. Small amounts of formaldehyde (for example, 5% by weight based on the polyamide) are operable and produce a definite change in the properties of the polyamide. When it is desired to convert an alcohol-insoluble polyamide into an alcohol-soluble product, the formaldehyde is preferably about 50 to 100% of the weight of the polyamide. Since the presence of a large excess of formaldehyde is not detrimental, there is no upper limit to operable concentrations of formaldehyde. This applies also to the amounts of alcohol used. For optimum operating conditions the molar ratio of alcohol to formaldehyde is at least one mole alcohol per mole of formaldehyde, and is preferably about two moles alcohol for one mole formaldehyde. With respect to the limits of the amount of formic acid needed, the lower limit for the solution method will be the smallest amount of formic acid required to form a homogeneous solution of the starting polyamide. Quantities of formic acid as small as ½ of the weight of polyamide can be used in the solution method and since the reaction proceeds in very dilute solutions there is no upper limit to the amount used. The unconsumed reagents, such as alcohols, formaldehyde and formic acid can be recovered, after insolation of the polymer, by distillation and by other suitable methods.

The polyamides treated according to this invention must contain a hydrogen-bearing amide group. This does not mean that all the amide nitrogen atoms in the polyamide must have a hydrogen atom attached thereto. A polyamide containing both hydrogen-bearing and non-hydrogen-bearing amide nitrogens, such as can be obtained by reacting a dibasic acid with a mixture of diprimary and disecondary diamines, can be used in the process of this invention.

The preferred polyamides are the polycarbonamides which include the polyureas, e. g. polydecamethylene urea. Other examples of useful polyamides are described in U. S. 2,071,253 and 2,130,948. However, polysulfonamides (U. S. 2,321,890 and 2,321,891), e. g. the polysulfonamide derived from decamethylenediamine and m-benzenedisulfonyl chloride, can also be used. Additional polymers which can be used are the polyurethanes and polythiourethanes (U. S. 2,284,637), e. g. the polymer derived from decamethylene diisocyanate and decamethylene glycol; polythionamides (U. S. 2,201,172), e. g. polydecamethylene thiourea; and polyhydrazides, e. g. that derived from hydrazine and sebacic acid.

The mention of formaldehyde herein refers not only to the common industrial forms, such as paraformaldehyde and aqueous formaldehyde solutions, but also to other forms of formaldehyde, such as trioxane, and to formaldehyde-yielding substances.

Alcohols, and particularly monohydric alcohols containing less than eight carbon atoms, are the preferred formaldehyde-reactive organic compounds containing hydrogen attached to one of the elements of the mentioned groups of the periodic table. Examples of alcohols which can be used in place of those mentioned in the foregoing examples include ethanol, propanol-1, propanol-2, the butanols, cyclohexanol, furfuryl alcohol, methoxyethanol, methoxymethoxyethanol, methyl isobutyl carbinol, octyl alcohol, lauryl alcohol, stearyl alcohol, unsaturated alcohols, such as allyl alcohol and oleyl alcohol, alcohols containing additional functional groups, such as ethanolformamide, beta-hydroxypropionitrile, mercaptoethanol, 2-nitro-1-butanol, glyconitrile, ethylenechlorohydrin, diacetone alcohol, quaternary salts of dimethyl-beta-hydroxyethylamine, di- and polyfunctional alcohols, such as ethylene glycol, nonamethylene glycol, diethylene glycol, 1,10-dihydroxyoctadecane, dihydroxytriethylene sulfide, 2-nitro-2 methyl-1,3-propanediol, glycerol and triethanolamine. The use of long chain monohydric alcohols (at least 12 carbon atoms) is desirable when modified polyamides having good water resistance are desired.

The mercaptans also form a useful class of formaldehyde-reactive compounds for use in the process. Suitable mercaptans are ethyl mercaptan, butyl mercaptan, octyl mercaptan, ethanedithiol, 1-thiosorbitol, allyl mercaptan, and mercaptoacetic acid.

Less preferred formaldehyde-reactive compounds are amides (including sulfonamides), amines and phosphines. Examples of such compounds are: Formamide, acetamide, N-methylacetamide, adipamide, benzamide, acetanilide, p-toluenesulfonamide, butanesulfonamide, N-methyl-benzenesulfonamide, diethylamine, methylamine, dimethylamine, piperazine, hexamethylenediamine, ethanolamine, allylamine, morpholine, methyl phosphine, dimethyl phosphine, phenyl phosphine, allyl phosphine, and cyclohexyl phosphine.

The process of this invention has a very marked effect on the properties of the polyamides, particularly their softening temperature, solubility, elasticity, and pliability. This is illustrated in the following table which compares a film of polyhexamethylene adipamide with films of three separate samples of N-methoxymethyl polyhexamethylene adipamide. In the table "tear resistance" is represented in Elmendorf units per mil of thickness and "pliability" is based on the stress-strain curve obtained on a Scott tester. "Elastic stretch" is the total elongation minus that portion thereof that is permanent.

mon organic solvents, especially aqueous methanol and ethanol, mixtures of alcohols and chlorinated hydrocarbons, e. g., methanol-chloroform mixtures, mixtures of acetone and water, and chloroform. By reason of their good solubility the modified polyamides are useful in making clear, tough films and in applying coatings onto various materials to give smooth finishes of outstanding properties. The unsupported film is useful as a general wrapping film. Sheets of the polymer can be formed on conventional milling equipment. Fabrics coated with pigmented N-alkoxymethyl polyamides can be flexed repeatedly without cracking and for this reason they are useful as substitutes for leather, e. g., in shoes, luggage, and upholstery. Coatings of N-alkoxymethyl polyamides and unsupported films thereof are resistant to penetration by gasoline and gasoline/benzene mixtures and are useful, in suitable construction, for the preparation of self-sealing fuel cells.

The action of dilute aqueous solutions (1–5%) of strong mineral acids, such as hydrochloric, on the N-alkoxymethyl polyamides results in the hydrolysis of the alkoxy group to regenerate the unsubstituted amide group. By proper control of the temperature and time of treatment with acid the proportion of groups removed can be controlled to any desired amount. The alkoxymethyl groups are stable to the action of aqueous sodium hydroxide and other alkalis but unetherified N-methylol groups are readily hydrolysed by these reagents. Thus, an N-alkoxymethyl polyamide which also contains some N-methylol groups may be freed of the methylol substituents by treatment with agents such as sodium hydroxide or sodium sulfite.

The products of this invention can be spun into filaments, yarns, bristles, or the like by the general methods for spinning polyamides, such as dry, wet and melt spinning, described in United States Patent 2,130,948. Suitable coagulating baths for wet spinning are acetone and concentrated salt baths e. g., concentrated aqueous solutions of magnesium chloride, calcium chloride or ammonium formate. However, in melt spinning the polymer should preferably be one free of methylol groups and should not be kept in the molten condition for a long period since this may convert it into the infusible form. The N-alkoxymethyl polyamides as ordinarily prepared contain some N-methylol groups but, as indicated above, these groups can be removed by treatment with alkali. The filaments and yarns can be used in admixture with other filaments and yarns. Of particular interest and utility are the highly elastic multifilament yarns which can be prepared from the products of this invention. By selection of products with the proper degree of amide substitution yarns having Table

| Polymer | Per Cent Methoxyl | Per Cent Amide Groups Substituted | Per Cent Solubility in hot 80% Ethanol | Melting Point, °C. | Tear Resistance | Elastic Stretch, Per Cent | Pliability |
|---|---|---|---|---|---|---|---|
| Polyhexamethylene adipamide | 0 | 0 | 0 | 264 | 5 | 45 | 10 |
| N-Methoxymethyl polyhexamethylene adipamide | 5.77 | 22 | >25 | 185 | 27 | 285 | 52 |
| Do | 7.81 | 32 | >50 | 130 | 15 to 20 | 370 | 220 |
| Do | 10.5 | 45 | >50 | 110 | 15 to 20 | 500 to 600 | 300 to 400 |

The present invention makes possible the production of polyamides which are soluble in common organic solvents, especially aqueous methaing elongation of 400–700% and essentially complete recovery from this elongation are readily obtained. These yarns are of use in the preparation of novel, light-weight elastic fabrics. Such yarns when cut into staple and converted to spun yarn, are desirable in the preparation of fabrics having high covering power for use in garments such as bathing suits.

Additional uses for the products are in the preparation of molded articles; electrical insulation, e. g., as an insulating coating of high abrasion resistance on electrical conductors, such as wires, cables and condenser plates; adhesives; safety glass interlayer; and impregnating agents. In these and other uses the modified polyamides can be admixed with plasticizers, e. g., aliphatic sulfonamides, aromatic sulfonamides, phenols, and other polyamide plasticizers; proteins; resins, e. g. phenolformaldehyde, urea-formaldehyde, and sulfonamide-formaldehyde resins; pigments, e. g. titanium dioxide and carbon black; dyes; cellulose derivatives; antioxidants; and other modifying agents.

An unusual property of films of these products and of fabrics coated with them is that they are permeable to moisture vapor; in some cases equalling or exceeding leather in this respect. These products, and particularly N-methoxymethyl polyhexamethylene adipamide, may also be used as finishes for various yarns to which they are applied from solution or aqueous dispersion. Such a finish, suitably applied in disperson form, or from solution may have a slight permanent stickiness and acts as an anti-slip finish of particular use for the preparation of highly snag resistant nylon hose. The finish is remarkably permanent to laundering.

As many apparently widely different embodiments of this invention may be made without departing from the spirit and scope thereof, it is to be understood that I do not limit myself to the specific embodiments thereof except as defined in the appended claims.

I claim:

1. A process for chemically modifying a linear polyamide having an intrinsic viscosity of at least 0.4 and having recurring hydrogen-bearing amide groups as an integral part of the main polymer chain, and having an average number of carbon atoms of at least two separating the amide groups, said process comprising reacting, in contact with a catalyst, said polyamide with at least 5% formaldehyde based on the weight of said polyamide, and with a substance of the class consisting of alcohols and mercaptans in which the thiol groups are attached to an aliphatic carbon atom, the molar ratio of said substance to formaldehyde being at least 1:1, and continuing the reaction until at least 10% of said hydrogen-bearing amide-groups have undergone reaction, said catalyst consisting of oxygen-containing acid having an ionization constant at least as great as $9.6 \times 10^{-6}$ and an equivalent conductance, measured at 25° C. in 0.01 N concentration, no greater than 370 ohms$^{-1}$. cm$^2$.

2. The process set forth in claim 1 in which said linear polyamide is a polycarbonamide.

3. The process set forth in claim 1 in which said linear polyamide is a polycarbonamide and said substance is a monohydric alcohol containing less than 8 carbon atoms.

4. The process set forth in claim 1 in which said polyamide is the reaction product of a diamine and a dibasic carboxylic acid, said substance is a monohydric alcohol containing less than 8 carbon atoms, and said acid is phosphoric acid.

5. A process for converting an alcohol-insoluble polycarbonamide, having an intrinsic viscosity of at least 0.4 and having recurring hydrogen bearing amide groups as an integral part of the main polymer chain and having an average number of carbon atoms of at least 2 separating the amide groups, into an alcohol-soluble product, said process comprising heating in contact with a catalyst said alcohol-insoluble polycarbonamide with formaldehyde, in amount from 50 to 100% by weight of said polycarbonamide, and a monohydric alcohol containing less than 8 carbon atoms, in amount of from 1 to 2 moles of the alcohol for each mole of formaldehyde, and continuing the heating until at least 10% of said hydrogen-bearing amide groups have undergone reaction, said catalyst consisting of oxygen-containing acid having an ionization constant at least as great as $9.6 \times 10^{-6}$ and an equivalent conductance, measured at 25° C. in 0.01 N concentration, no greater than 370 ohms$^{-1}$. cm$^2$.

6. The process set forth in claim 5 wherein said alcohol is methanol.

7. The process set forth in claim 5 wherein said acid is phosphoric.

8. The process set forth in claim 5 wherein said polycarbonamide is polyhexamethylene adipamide, said alcohol is methanol, and said acid is phosphoric.

9. A linear polyamide having an intrinsic viscosity of at least 0.4 and containing, as an integral part of the main polymer chain recurring groups of formula

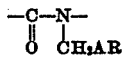

which are separated by an average number of carbon atoms of at least 2 and wherein A represents a chalcogen of atomic weight less than 33 and R represents the organic radical obtained by removal of HA from a compound of formula HAR, wherein said compound represents a substance of the class consisting of alcohols and mercaptans in which the thiol group is attached to an aliphatic carbon atom, said groups constituting at least 10% of the amide groups in the main polymer chain.

10. A linear polyamide having an intrinsic viscosity of at least 0.4 and containing, as an integral part of the main polymer chain recurring groups of formula

which are separated by an average number of carbon atoms of at least 2 and wherein A represents a chalcogen of atomic weight less than 33 and R represents an alkyl group containing less than 8 carbons, said groups constituting at least 10% of the amide groups in the main polymer chain.

11. A flexible fabric having a coating of the polyamide defined in claim 9.

12. A yarn comprising filaments of the polyamide defined in claim 9.

13. A self-supporting film comprising the polyamide defined in claim 9.

14. A process which comprises heating the linear polyamide defined in claim 9 from 100° C. to 285° C. until said polyamide is converted into an essentially insoluble and infusible product.

15. An essentially insoluble and infusible product obtained by heating from 100° C. to 285° C. the product of claim 9.

THEODORE LE SUEUR CAIRNS.

REFERENCES CITED

The following references are of record in the file of this patent:

UNITED STATES PATENTS

| Number | Name | Date |
|---|---|---|
| 2,244,184 | Austin et al. | June 3, 1941 |
| 2,173,005 | Strain | Sept. 12, 1939 |
| 2,191,957 | Edgar et al. | Feb. 27, 1940 |
| 2,145,242 | Arnold | Jan. 31, 1939 |
| 2,141,169 | Catalin | Dec. 27, 1938 |
| 2,317,181 | D'Alelio | Apr. 20, 1943 |